(No Model.)
F. V. GREENE.
UNDERGROUND CONDUIT FOR ELECTRIC WIRES.
No. 351,697. Patented Oct. 26, 1886.
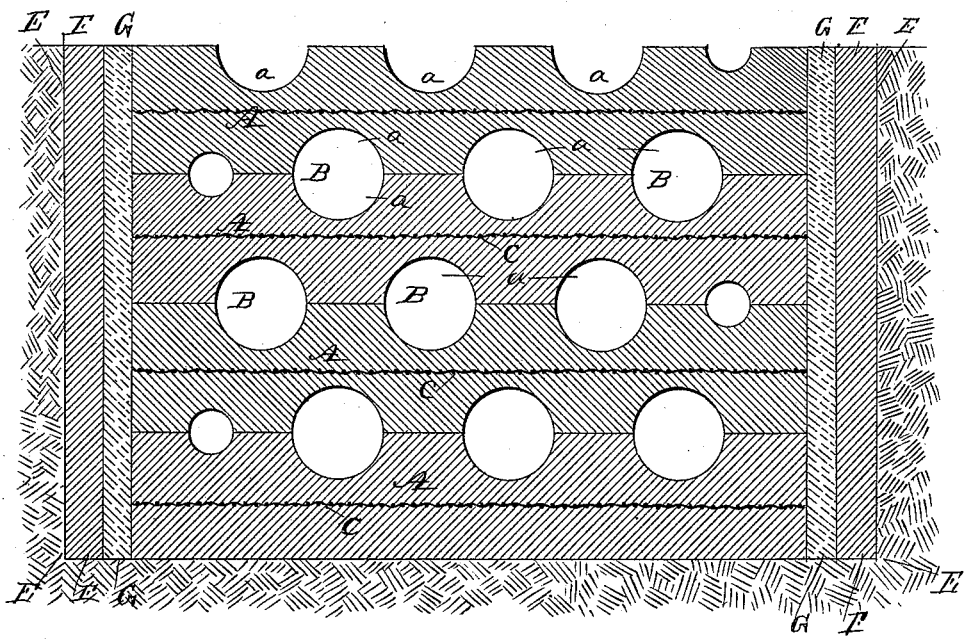
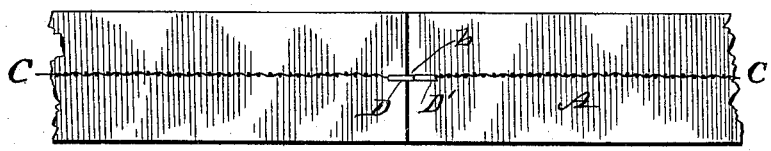
WITNESSES
Edwin L. Yewell,
W. C. Stearns
INVENTOR
F. V. Greene
By L. W. Simsabaugh
Attorney

UNITED STATES PATENT OFFICE.

FRANCIS V. GREENE, OF NEW YORK, N. Y., ASSIGNOR TO THE BARBER ASPHALT PAVING COMPANY, OF WASHINGTON, D. C.

UNDERGROUND CONDUIT FOR ELECTRIC WIRES.

SPECIFICATION forming part of Letters Patent No. 351,697, dated October 26, 1886.

Application filed July 28, 1886. Serial No. 209,299. (No model.)

*To all whom it may concern:*

Be it known that I, FRANCIS V. GREENE, a citizen of the United States, residing at New York, in the county of New York, State of New York, have invented certain new and useful Improvements in Underground Conduits for Telegraph-Wires, &c., of which the following is a specification, reference being had therein to the accompanying drawings.

My invention relates to improvements in underground conduits for telegraph wires and cables, and to that class known as "drawing-in conduits."

The object of my invention is to provide a conduit which can be increased in size as the demand for additional wires increases, and provide a conduit impervious to moisture, and at the same time make provision for the escape of induced currents of electricity, which would otherwise disturb the wires or cables of the working-lines.

My invention consists in making the conduits in the form of slabs from a bituminous concrete, in which are formed longitudinal grooves or gutters for the reception of the wires, and in which is embedded a wire-netting for conveying off the induced currents of electricity, as will more fully appear.

Other novel and important features of my invention will be described, and pointed out in the claims.

Referring to the drawings, Figure 1 is a vertical sectional view of a conduit as laid in a trench in the ground. Fig. 2 is a side elevation of two of the slabs, showing the wire-netting and the metal plates which join the wire-netting.

One difficulty in regard to the underground conduits as hitherto made is that they have been made of a certain and predetermined size at the factory, and the number of tubes for the wires cannot be increased as the demand for additional tubes increases. I obviate this by making the conduit of a series of slabs in such a manner that additional slabs can be added at any time and the capacity of the conduit increased to any desired extent as the demand for additional wires increases.

A indicates the slabs, which are made of bituminous concrete, said slabs being provided on both sides with a series of longitudinal grooves or gutters, a, which register with similar grooves in the adjacent slab, so as to form continuous tubes B for the reception of the wires or cables.

As before intimated, the slabs are made of the well-known bituminous concrete, in which the body is composed of sand, fine pebbles, stone, stone-dust, sawdust, or other similar material, and the cementing substance is either natural bitumen or a combination of different bitumens, softened, if necessary, with a suitable product of the distillation of petroleum; or the cementing material may be wholly or partly composed of the products of the distillation of coal-tar. The material is heated and the slabs formed in molds under pressure or in any suitable manner.

C indicates wire-netting embedded in the center of the slabs, the ends of said netting being connected to steel plates D D', the plate D' being set back a short distance from the end of the slab, while the plate D projects slightly beyond the end of the adjacent slab, so that when the slabs are laid end to end the projecting metal plate D will enter the recess b, formed in the adjacent slab, and be brought in contact with the plate D', thus allowing the two slabs to be brought snugly together, and at the same time forming a continuous conductor for the induced currents to pass off through the wire-netting, and thus avoid any disturbance of the electrical currents in the working-lines. A further office of the wire-netting is to give strength and rigidity to the slabs, so they can be readily handled without bending or breaking.

The slabs are made of any suitable size, but preferably from three to five feet long, ten to fifteen inches wide, and two to four inches thick, and when laid as indicated in the drawings they form the longitudinal conduits or circular recesses B, through which the wires are drawn.

The slabs are laid in the trench or excavation E, as already indicated; and in order to prevent the water or moisture from penetrating between the slabs, I place a continuous line of thin boards or other material, F, along the trench, and about one inch (more or less)

from the sides of the slabs, and the space thus left between the plank or lining and slabs is filled with a hot solution or rich bituminous concrete, which by its heat softens the slabs on their edges, and when it is cooled the joints will be found to be completely closed and rendered impervious to moisture. The joints at the ends of the slabs may be joined with hot bitumen, or may be cemented by passing a hot iron over the same, so as to melt the material of which the slabs are made at that point. The slabs may be united at the factory and laid in sections in the trench; but I prefer to build up the conduit in the trench, as already indicated, and if at any subsequent time it should be necessary to increase the wire-holding capacity of the conduit this can be readily done by removing the pavement, uncovering the conduit, and adding one or more slabs, or as many as may be necessary, to give the required number of tubes.

Having thus described my invention, what I claim, and desire to secure by Letters Patent, is—

1. In conduits for underground electrical wires, the slabs, blocks, or other wire or cable holding forms of concrete, having wire-netting embedded therein, as set forth.

2. In a conduit for underground electrical wires, the slabs A, provided with the wire-netting C, and plates D and D', arranged as described, whereby the induced currents are carried off, as set forth.

3. A conduit for underground telegraph wires or cables composed of a series of grooved slabs laid as described, in combination with the plank or partition F and filling G, as set forth.

In testimony whereof I affix my signature in presence of two witnesses.

FRANCIS V. GREENE.

Witnesses:
JOHN P. WHITEHORN,
CHARLES W. GREENE.